Patented Apr. 27, 1937

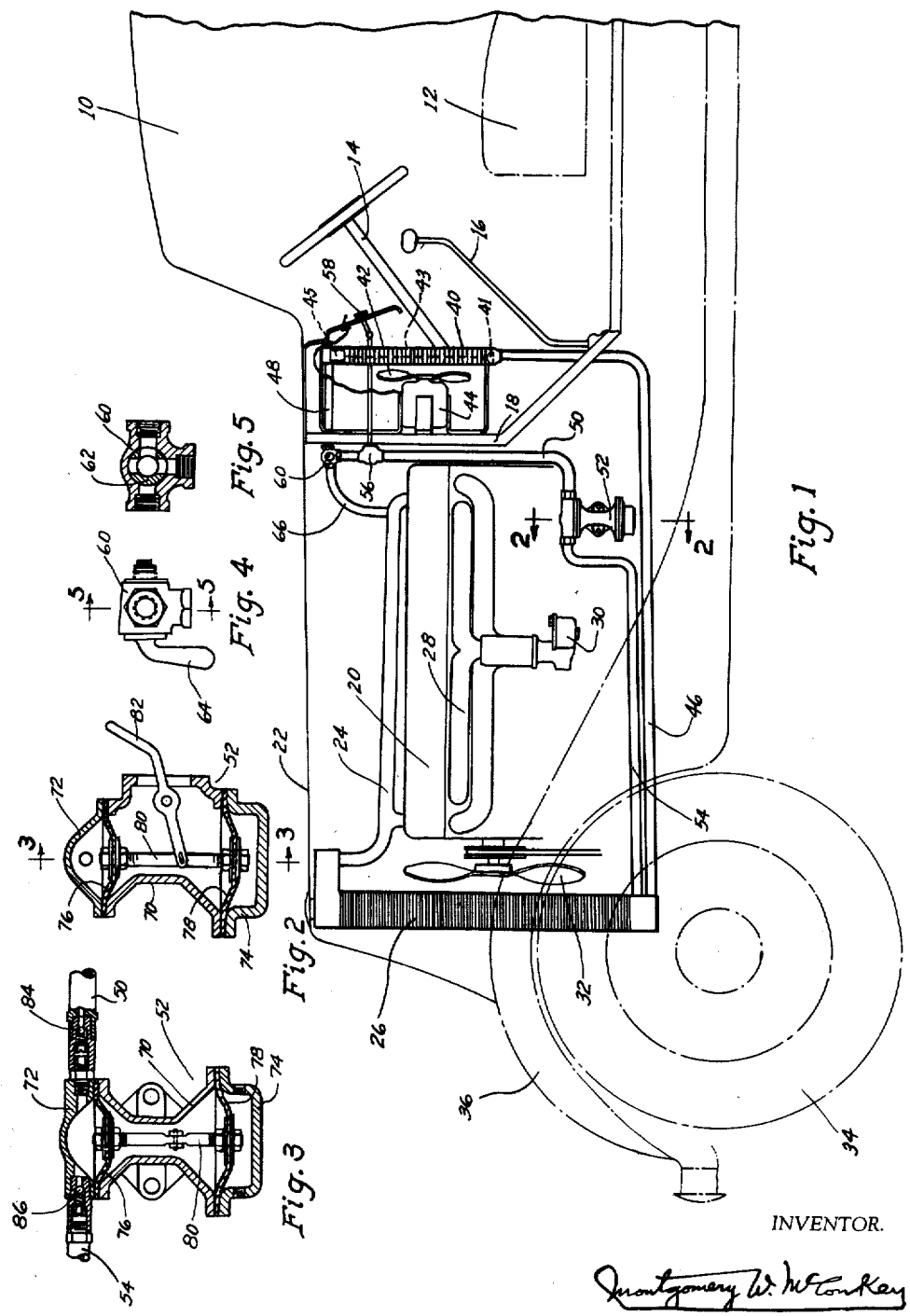

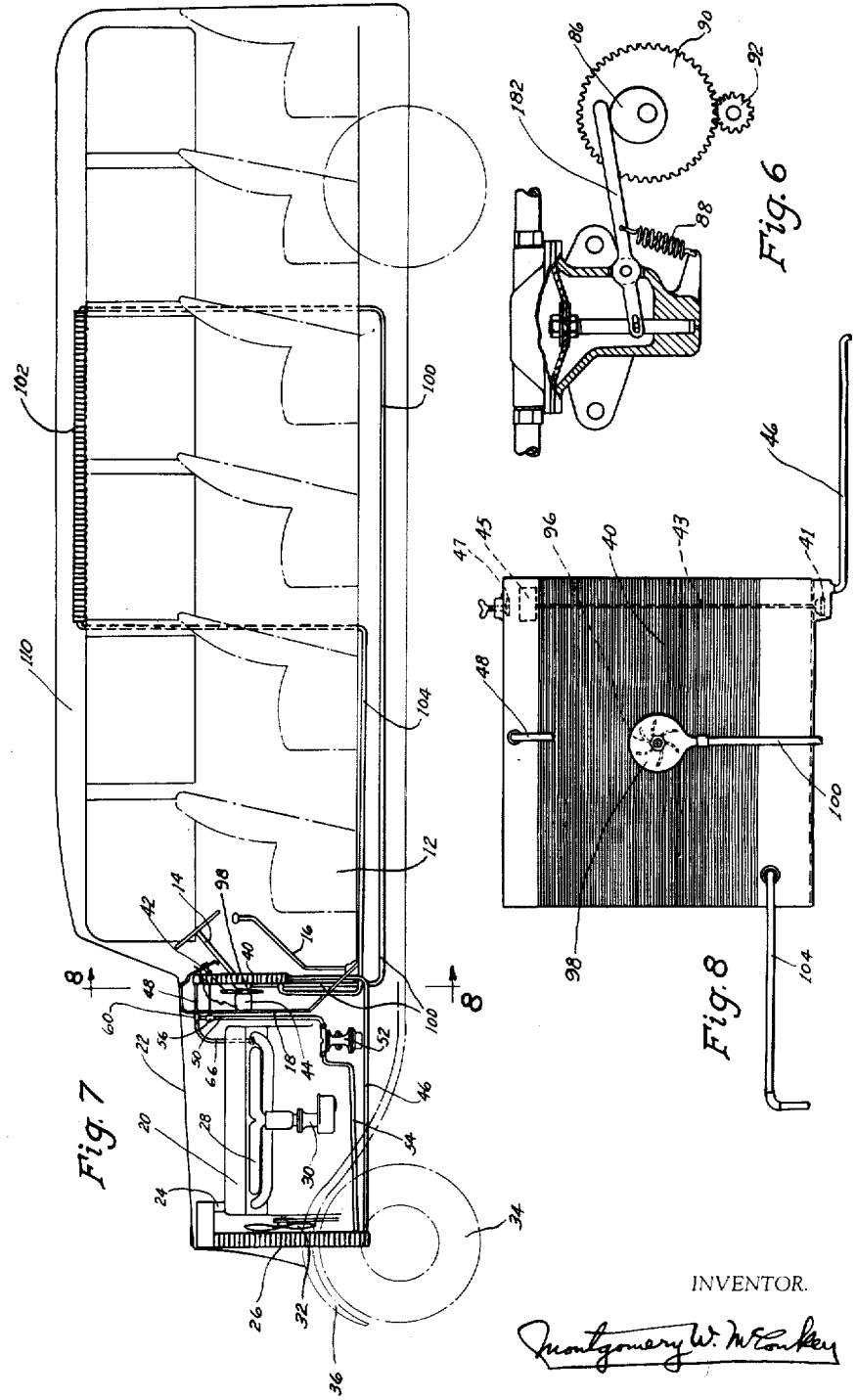

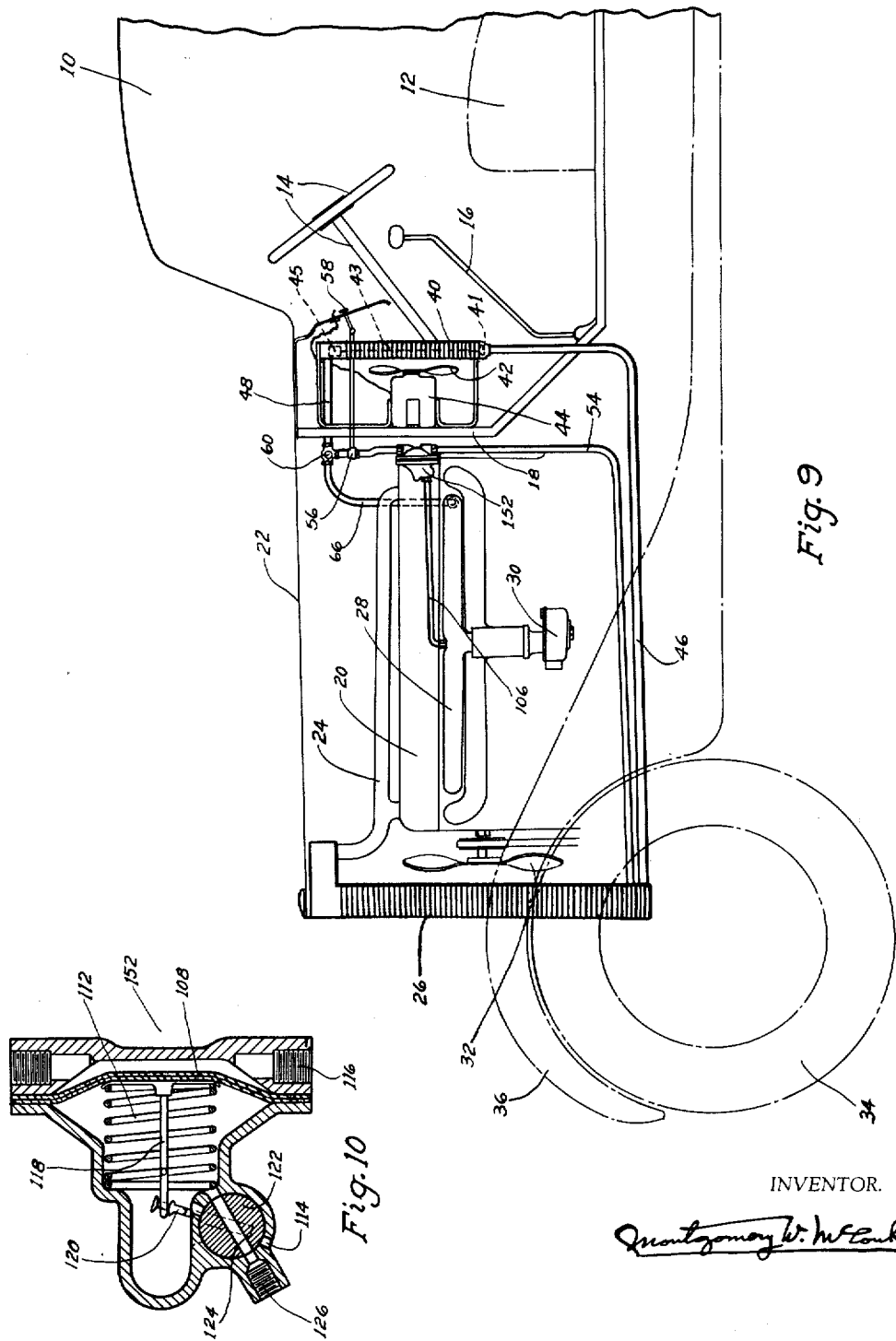

2,078,804

UNITED STATES PATENT OFFICE 2,078,804

COOLING MECHANISM

Montgomery W. McConkey, Chicago, Ill.

Application December 14, 1933, Serial No. 702,340

17 Claims. (Cl. 257—7)

This invention relates to automobiles and other vehicles, and is illustrated as embodied in an automobile having a novel cooling system for cooling the interior of the vehicle body in hot weather.

Objects of the invention are to provide a simple system adapted for use in vehicles, and preferably operated by the engine which drives the vehicle, and to provide a system using the usual engine cooling system to provide the fluid medium necessary to convey the heat from within the vehicle and to utilize the usual radiator of the engine-cooling system as a condenser for the vehicle-cooling system.

In one desirable arrangement, a cooling means such as a radiator is arranged inside the vehicle, and is connected to the engine radiator so that it is automatically kept nearly full of water. The upper portion of the cooling radiator is kept under sub-atmospheric pressure by an engine-driven pump, to cool the water in the vehicle radiator by continuous evaporation of part of its contents, the heat being transferred from inside the vehicle through the medium of the water vapor so formed. An important phase of the invention relates to retaining the evaporated water in the system by condensing this vapor in the usual engine-cooling radiator.

Two forms of engine-driven pump are shown, one a pump driven mechanically by the engine camshaft, and the other being a novel pump operated by a vacuum connection from the intake manifold of the engine. It is also possible to drive the pump indirectly from the engine by using an electric pump operated by current from the vehicle ignition and lighting system, with its battery and engine-driven generator as the immediate source of current.

In cooling a bus or truck body, the water cooled as described above may be circulated through suitable radiators or the like arranged at desired points; I prefer to circulate the cooled water for this purpose by a small pump or the like driven by the armature shaft of a motor which also drives a fan circulating air through the vehicle radiator. Such a fan without the circulating pump may also be provided when only the main vehicle-cooling radiator is provided.

I prefer also to combine the above-described cooling system with a hot-water heating system for use in the winter, the change preferably being effected by turning a single valve.

The above and other objects and features of the invention, including various novel combinations of the pump and radiator and other parts, and desirable and improved specific constructions of the pumps and other elements and subcombinations, will be apparent from the following description of the illustrative embodiment shown in the accompanying drawings, in which:

Figure 1 is a vertical section longitudinally through the front end of an automobile, showing the engine and the engine-driven pump in side elevation;

Figure 2 is a section through the pump on the line 2—2 of Figure 1;

Figure 3 is a section through the pump on the line 3—3 of Figure 2;

Figure 4 is an enlarged side elevation of the valve for changing over from a cooling system to a heating system;

Figure 5 is a section through this valve on the line 5—5 of Figure 4;

Figure 6 is a section corresponding to part of Figure 2, but showing an electric pump driven indirectly through the ignition and lighting system of the engine;

Figure 7 is a section longitudinally through a bus (or truck) having means to circulate the cooled water to various parts of the body;

Figure 8 is a section on the line 8—8 of Figure 7, showing the vehicle-radiator connections;

Figure 9 is a section corresponding to Figure 1, but showing a different kind of engine-driven pump; and Figure 10 is a section through the pump of Figure 9.

Figure 1 illustrates an automobile having a body 10 which is to be cooled (or heated), and within which is shown a driver's seat 12 and the usual steering mechanism 14 and gearshift lever 16. The body proper is separated by a dash 18 from a forward compartment containing an engine 20 and covered by a hood 22. The term "dash" is used herein to designate broadly any means separating the body proper from the engine compartment.

The engine illustrated is of the water-cooled variety, and has a water jacket discharging through conduit connections 24 with the top of an engine-cooling radiator 26 of any desired type, the bottom of the radiator 26 communicating through the usual water-circulating pump with the bottom of the water jacket of the engine.

The engine has the usual intake manifold 28, to which a fuel mixture is fed by means such as a carbureter 30. Air is drawn through the radiator 26, when the engine is running, by means such as an engine-driven fan 32. One front wheel is indicated at 34, and its fender at 36.

The present invention relates to the cooling, or cooling and heating, of the space within the body 10 (or the bus or truck body 110 shown in Figure 7). In one desirable arrangement, a cooling radiator 40 of any desired construction is arranged within the body, preferably supported on the rear or driver's side of the dash 18.

The radiator may be provided with an air circulating fan 42 driven by an electric motor 44 and arranged between the dash 18 and the radiator 40, and supported by the dash either directly or through the medium of the radiator. The motor 44 is supplied with current from the usual ignition and lighting system of the car, with its battery and engine-driven generator, and is therefore indirectly driven by the engine 20.

According to one feature of the invention, the radiator 40 is automatically kept nearly full of water supplied from the engine radiator 26, for example by a conduit 46 connecting the bottoms of the two radiators. The supply conduit 46 is controlled in any desired manner, as for example by a float valve shown as including a valve member 41 having a flexible connection 43 to a float 45 in the upper part of the radiator.

When the radiator 40 is full of water to the desired level, the float 45 pulls the valve 41 up against its seat to close off communication with the conduit 46. When the water level drops, float 45 also drops and allows the valve 41 to open and let more water flow in to bring the level back to the point at which the float 45 again shuts the valve. The float valve is removed, or provided with suitable means 47 (Figure 8) to hold it open, when the device is in use as a heater. This keeps the water in radiator 40 at substantially the same height as in radiator 26.

When the radiator 40 is used in the winter to heat the interior of the body 10, the conduit 46 serves as a return line for the hot water circulated through the radiator 40 from the engine water jacket or from the discharge connection 24 of the jacket.

The top of the radiator 40 communicates, above the water level when the system is being used as a cooling system, by means such as a conduit 48 with a conduit 50 leading to an engine-driven pump 52 which discharges through a conduit 54 into the bottom of the radiator 26.

The effective area of the conduit 50, and therefore the rate of cooling, may be throttled by any suitable valve 56 operated by a button or the like 58 on the instrument board.

The conduits 48 and 50 communicate through a two-way valve 60 (Figures 4 and 5) having, in the illustrated form, a rotatable conical valve member 62 having passages which (in the position shown) connect conduits 48 and 50. Turning member 62 by means such as a handle 64 cuts off the connection with the conduit 50, and connects the conduit 48 with a heating circuit conduit 66 communicating with the water jacket of the engine and therefore circulating hot water through the radiator 40 to heat the interior of the body 10 in the winter.

The particular pump 52 illustrated in Figures 2 and 3 is a double pump, the lower half of the pump being a fuel pump for feeding gasoline to the carburetor 30, and the upper half being a vacuum pump for exhausting the upper part of radiator 40 to vaporize part of the water therein, and to deliver the water vapor so formed through the conduit 54 to the radiator 26 in which it is then condensed as it rises through the water therein.

In effect, heat is abstracted from the car body 10 by the described vaporization of the water, and is given up in the radiator 26 to the air drawn therethrough by the fan 32 and by the passage of the radiator 26 through the atmosphere as the car moves forward.

The illustrated pump 52 includes a double-conical casing 70 mounted on the engine 20, and which is closed at top and bottom by domed covers 72 and 74 which are bolted or otherwise secured thereto in such a manner as to clamp thereagainst the margins of the two pump diaphragms 76 and 78.

These diaphragms are operated by a vertically-reciprocating plunger 80 connected to both of them at their centers, and which is operated by means such as a pivoted lever 82 extending through a slot in the side of the casing 70. The lever 82 is oscillated by a cam on the camshaft of the engine in the manner usual for operating fuel pumps.

The lower diaphragm 78 forms the movable element of a pump for feeding gasoline to the carbureter 30. As such pumps, operated as illustrated, are well known, it is not further described herein.

The upper diaphragm 76, on its downward stroke, sucks water vapor (or a mixture of such vapor and air) from the conduit 50 through a check valve 84 which opens toward the left and closes off toward the right in Figure 3. On its upward stroke, it forces the fluid above it past a check valve 86 opening in the opposite direction, and through the conduit 54, into the radiator 26 (which in this case is serving the double function of a radiator for the engine-cooling system and a condenser for the body-cooling system).

As shown in Figure 6, the diaphragm 76 and its plunger 80 may be operated, if preferred, by a lever 182 or the like oscillated by means such as an eccentric or cam 86 and a spring 88 holding the lever 182 thereagainst. The eccentric 86 is slowly rotated by means such as a large gear 90 driven by a pinion 92 on the end of the armature shaft of the fan motor 44. In this case the vacuum pump is driven by the engine indirectly, through its electrical system.

In the arrangement of Figures 7 and 8, which is especially adapted for a bus or a truck, the armature shaft of the fan motor 44 has a centrifugal impeller 96, or other pump means, in a casing 98 communicating with the radiator 40, to circulate the cooled water through a conduit 100 through one or more auxiliary radiators 102 (shown supported on the roof of the car) and back through a return pipe 104 to the radiator 40.

In the arrangement of Figures 9 and 10, in lieu of a cam-driven vacuum pump there is an engine-driven fluid operated pump 152 connected by a conduit 106 to the intake manifold 28 of the engine and driven by the reduced pressure in that manifold.

In its illustrated form, the pump includes a diaphragm 108 driven toward the right by a spring 112 when an air vent 114 is open, thereby forcing the fluid in the pump downwardly through an exhaust opening 116 and past the check valve 86 into the conduit 54, the check valve 84 at this time being closed.

At the end of the stroke of the diaphragm 108, the slotted end of a connecting link 118 engages a control arm 120 and rocks a valve 122 to aline its passage 124, as shown, with an intake passage 126 communicating with the conduit 106. This closes off the air vent 114 and causes the suction existing in the engine manifold to draw the diaphragm 108 to the left and compress spring 112, at the same time drawing water vapor (or a mixture of vapor and air) past the check valve 84 into the pump. At the end of this stroke, the slotted end of the link 118 again engages and shifts the arm 120, to close the passage 126 and open the passage 114.

In all of the constructions described above, the power of the engine is used through a pump or the equivalent to evaporate part of the water in the radiator 40 and thereby to cool the water remaining therein, and in all cases the engine radiator 26 is utilized as a condenser to condense the vapor so formed. Thereby the air in the body 10 or 110, circulated past the radiator 40 (and 102) by means such as the fan 42, gives up part of its heat to the water therein, which heat is eventually given up to the air passing through the engine radiator 26 as the vapor from conduit 54 condenses therein.

While several illustrative embodiments have been described in detail, it is not my intention to limit the scope of the invention to those particular embodiments, or otherwise than by the terms of the appended claims.

I claim:

1. An automotive vehicle having a water-cooled engine provided with a water-circulating system including a radiator for cooling the water therein, another radiator in said vehicle supplied with water from the engine cooling system, and engine-operated means for establishing a reduced pressure in said other radiator to evaporate part of the water therein and thereby to reduce the temperature of the remaining water, and to deliver the vapor formed by the evaporated water to the first radiator to be condensed therein.

2. An automotive vehicle having a water-cooled engine provided with a water-circulating system including a radiator for cooling the water therein, another radiator in said vehicle supplied with water from the engine cooling system, and means for establishing a reduced pressure in said other radiator to evaporate part of the water therein and thereby to reduce the temperature of the remaining water, and to deliver the vapor formed by the evaporated water to the first radiator to be condensed therein.

3. An automotive vehicle having a water-cooled engine provided with a water-circulating system including a radiator for cooling the water therein, another radiator in said vehicle supplied with water from the engine cooling system, and an engine-driven mechanical pump for establishing a reduced pressure in said other radiator to evaporate part of the water therein and thereby to reduce the temperature of the remaining water, and to deliver the vapor formed by the evaporated water to the first radiator to be condensed therein.

4. An automotive vehicle having a water-cooled engine provided with a water-circulating system including a radiator for cooling the water therein, another radiator in said vehicle supplied with water from the engine cooling system, and a suction-operated pump connected to the engine intake manifold for establishing a reduced pressure in said other radiator to evaporate part of the water therein and thereby to reduce the temperature of the remaining water, and to deliver the vapor formed by the evaporated water to the first radiator to be condensed therein.

5. An automotive vehicle divided by a transverse dash into an engine compartment and a body compartment and having a water-cooled engine in said engine compartment and provided with a water-circulating system including a vertical radiator arranged at the front end of the engine compartment for cooling the water in said system, another radiator in said vehicle in the body compartment behind said dash supplied with water from the engine cooling system, and engine-operated means for establishing a reduced pressure in said other radiator to evaporate part of the water therein and thereby to reduce the temperature of the remaining water, and to deliver the vapor formed by the evaporated water to the first radiator to be condensed therein.

6. A vehicle having an engine with a water-cooling system, a radiator provided with float-operated means to supply thereto water from said system to a desired level, and means to evaporate water from said radiator as a vapor and to deliver the vapor to said system to be condensed therein.

7. A vehicle having an engine with a water-cooling system, a radiator provided with float-operated means to supply thereto water from said system to a desired level, means to evaporate water from said radiator as a vapor and to deliver the vapor to said system to be condensed therein, and means for alternatively connecting said radiator to said system to circulate through said radiator engine-heated water from said system.

8. A system for cooling the air in an automotive vehicle comprising, in combination with an internal combustion engine for driving said vehicle and having a water-cooling system, refrigerating means operated by power derived from the engine and adapted to remove heat from the air in said vehicle, and means for transmitting the heat to said water-cooling system and dissipating it therein.

9. A system for cooling the air in an automotive vehicle having a passenger compartment and an engine compartment and comprising, in combination with an internal combustion engine in the engine compartment and having a water-cooling system, refrigerating means including a pump in the engine compartment operated by power derived from the engine and cooling means in the passenger compartment connected to the pump and adapted to remove heat from the air, and means for transmitting the heat to said water-cooling system and dissipating it therein.

10. A system for cooling air comprising, in combination with a water-cooled internal combustion engine provided with a radiator, refrigerating means operated by power derived from the engine and employing a refrigerating cycle involving condensation of refrigerating vapor, said condensation being carried out in said radiator.

11. In an automotive vehicle having a passenger compartment and a water-cooled engine provided with a water-circulating system including a radiator, a closed receptacle supplied with water from said cooling system, means for subjecting said receptacle to reduced pressure to evaporate part of the water therein, and to deliver the vapor formed by the evaporated water to the radiator to be condensed therein, a second radiator in said passenger compartment, and means for circulating water to and from said receptacle through said second radiator.

12. In an automotive vehicle having a passenger compartment and a water-cooled engine provided with a water circulating system including a radiator, a closed receptacle supplied with water from said cooling system, means operated by power derived from the engine for subjecting said receptacle to reduced pressure to evaporate part of the water therein, and to deliver the vapor formed by the evaporated water to the radiator to be condensed therein, a second radiator in said passenger compartment, and means for circulating water to and from said receptacle through said second radiator.

13. In a refrigerating system, in combination with an engine provided with a water-cooling system, a radiator provided with float operated means to supply thereto water from said system to a desired level, and means to evaporate water from said radiator as a vapor and to deliver the vapor to said system to be condensed therein.

14. In a heating and cooling system, in combination with an engine provided with a water-cooling system, a radiator provided with float operated means to supply thereto water from said system to a desired level, and means to evaporate water from said radiator as a vapor and to deliver the vapor to said system to be condensed therein, and means for alternatively connecting said radiator to said system to circulate through said radiator engine-heated water from said system.

15. An automotive vehicle divided by a transverse dash into an engine compartment and a body compartment and having a water-cooled engine in said engine compartment and provided with a water-circulating system including a vertical radiator arranged at the front end of the engine compartment for cooling the water in said system, another radiator in said vehicle in the body compartment behind said dash supplied with water from the engine cooling system, engine-operated means for establishing a reduced pressure in said other radiator to evaporate part of the water therein and thereby to reduce the temperature of the remaining water, and to deliver the vapor formed by the evaporated water to the first radiator to be condensed therein, and means for circulating air over said second radiator.

16. A cooling system for cooling the air in an automotive vehicle having a passenger compartment and an engine compartment containing an internal combustion engine driving the vehicle and provided with a water cooling system and which comprises, in combination with said engine and its water-cooling system, refrigerating means including a pump in the engine compartment operated by power derived from the engine, cooling means in the passenger compartment connected to said pump and adapted to remove heat from the air in the passenger compartment, and means for transferring said heat from the cooling means to said water cooling system.

17. A cooling system for an automotive vehicle having a passenger compartment and an engine compartment containing an engine driving the vehicle and comprising refrigerating means including a heat-transfer device in the passenger compartment arranged to take up heat from the air in that compartment, a pump arranged to circulate a refrigerant fluid to the heat-transfer device, and common means for taking up said heat from the refrigerant fluid and for cooling said engine.

MONTGOMERY W. McCONKEY.

---

CERTIFICATE OF CORRECTION.

Patent No. 2,078,804.                                                April 27, 1937.

MONTGOMERY W. McCONKEY.

It is hereby certified that error appears in the printed specification of the above numbered patent requiring correction as follows: Page 3, second column, after line 65, insert the following as claim 11:-

11. In an automotive vehicle having a water-cooled engine provided with a water-circulating system including a radiator, a closed receptacle supplied with water from said cooling system, and means for subjecting said receptacle to reduced pressure to evaporate part of the water therein, and to deliver the vapor formed by the evaporated water to the radiator to be condensed therein.;

and for the claims now appearing in the patent as numbers 11, 12, 13, 14, 15, 16 and 17 read 12, 13, 14, 15, 16, 17 and 18 respectively;; and that the said Letters Patent should be read with these corrections therein that the same may conform to the record of the case in the Patent Office.

Signed and sealed this 13th day of July, A. D. 1937.

(Seal)

Henry Van Arsdale
Acting Commissioner of Patents.

means for circulating water to and from said receptacle through said second radiator.

12. In an automotive vehicle having a passenger compartment and a water-cooled engine provided with a water circulating system including a radiator, a closed receptacle supplied with water from said cooling system, means operated by power derived from the engine for subjecting said receptacle to reduced pressure to evaporate part of the water therein, and to deliver the vapor formed by the evaporated water to the radiator to be condensed therein, a second radiator in said passenger compartment, and means for circulating water to and from said receptacle through said second radiator.

13. In a refrigerating system, in combination with an engine provided with a water-cooling system, a radiator provided with float operated means to supply thereto water from said system to a desired level, and means to evaporate water from said radiator as a vapor and to deliver the vapor to said system to be condensed therein.

14. In a heating and cooling system, in combination with an engine provided with a water-cooling system, a radiator provided with float operated means to supply thereto water from said system to a desired level, and means to evaporate water from said radiator as a vapor and to deliver the vapor to said system to be condensed therein, and means for alternatively connecting said radiator to said system to circulate through said radiator engine-heated water from said system.

15. An automotive vehicle divided by a transverse dash into an engine compartment and a body compartment and having a water-cooled engine in said engine compartment and provided with a water-circulating system including a vertical radiator arranged at the front end of the engine compartment for cooling the water in said system, another radiator in said vehicle in the body compartment behind said dash supplied with water from the engine cooling system, engine-operated means for establishing a reduced pressure in said other radiator to evaporate part of the water therein and thereby to reduce the temperature of the remaining water, and to deliver the vapor formed by the evaporated water to the first radiator to be condensed therein, and means for circulating air over said second radiator.

16. A cooling system for cooling the air in an automotive vehicle having a passenger compartment and an engine compartment containing an internal combustion engine driving the vehicle and provided with a water cooling system and which comprises, in combination with said engine and its water-cooling system, refrigerating means including a pump in the engine compartment operated by power derived from the engine, cooling means in the passenger compartment connected to said pump and adapted to remove heat from the air in the passenger compartment, and means for transferring said heat from the cooling means to said water cooling system.

17. A cooling system for an automotive vehicle having a passenger compartment and an engine compartment containing an engine driving the vehicle and comprising refrigerating means including a heat-transfer device in the passenger compartment arranged to take up heat from the air in that compartment, a pump arranged to circulate a refrigerant fluid to the heat-transfer device, and common means for taking up said heat from the refrigerant fluid and for cooling said engine.

MONTGOMERY W. McCONKEY.

CERTIFICATE OF CORRECTION.

Patent No. 2,078,804.        April 27, 1937.

MONTGOMERY W. McCONKEY.

It is hereby certified that error appears in the printed specification of the above numbered patent requiring correction as follows: Page 3, second column, after line 65, insert the following as claim 11:-

11. In an automotive vehicle having a water-cooled engine provided with a water-circulating system including a radiator, a closed receptacle supplied with water from said cooling system, and means for subjecting said receptacle to reduced pressure to evaporate part of the water therein, and to deliver the vapor formed by the evaporated water to the radiator to be condensed therein.;

and for the claims now appearing in the patent as numbers 11, 12, 13, 14, 15, 16 and 17 read 12, 13, 14, 15, 16, 17 and 18 respectively;; and that the said Letters Patent should be read with these corrections therein that the same may conform to the record of the case in the Patent Office.

Signed and sealed this 13th day of July, A. D. 1937.

(Seal)

Henry Van Arsdale
Acting Commissioner of Patents.

CERTIFICATE OF CORRECTION.

Patent No. 2,078,804. April 27, 1937.

MONTGOMERY W. McCONKEY.

It is hereby certified that error appears in the printed specification of the above numbered patent requiring correction as follows: Page 3, second column, after line 65, insert the following as claim 11:-

11. In an automotive vehicle having a water-cooled engine provided with a water-circulating system including a radiator, a closed receptacle supplied with water from said cooling system, and means for subjecting said receptacle to reduced pressure to evaporate part of the water therein, and to deliver the vapor formed by the evaporated water to the radiator to be condensed therein.;

and for the claims now appearing in the patent as numbers 11, 12, 13, 14, 15, 16 and 17 read 12, 13, 14, 15, 16, 17 and 18 respectively;; and that the said Letters Patent should be read with these corrections therein that the same may conform to the record of the case in the Patent Office.
Signed and sealed this 13th day of July, A. D. 1937.

Henry Van Arsdale (Seal) Acting Commissioner of Patents.